United States Patent [19]

Eichfeld et al.

[11] 4,232,856
[45] Nov. 11, 1980

[54] WORK HOLDING TABLE

[76] Inventors: Timothy J. Eichfeld; Horace C. Disston, Jr., both of Pennsauken, N.J.

[21] Appl. No.: 12,603

[22] Filed: Feb. 16, 1979

Related U.S. Application Data

[63] Continuation-in-part of Ser. No. 907,093, May 18, 1978, Pat. No. 4,140,308, which is a continuation-in-part of Ser. No. 6,095, Jan. 24, 1979.

[51] Int. Cl.$^3$ ............................................. B25B 1/00
[52] U.S. Cl. ...................................... 269/93; 269/166
[58] Field of Search ................. 408/115, 109, 95, 97, 408/98; 269/91, 93, 75, 166, 167, 246, 87.3

[56] References Cited

U.S. PATENT DOCUMENTS

| 344,033 | 6/1886 | Dehne | 269/166 |
|---|---|---|---|
| 2,559,716 | 7/1951 | Gaudreau | 269/93 |
| 4,039,178 | 8/1977 | Odames | 269/75 |

*Primary Examiner*—Robert C. Watson
*Attorney, Agent, or Firm*—Robert K. Youtie

[57] ABSTRACT

A work holding table wherein a generally U-shaped yoke receives in its opening or throat the edge margin of a table top for selective positioning of the yoke about the table margin. An arm is carried by the yoke and extends over the table for downward pressing engagement with a work piece on the table to clamp the latter and cock or jam the yoke in position with respect to the table.

7 Claims, 3 Drawing Figures

WORK HOLDING TABLE

CROSS-REFERENCES TO RELATED APPLICATIONS

This application is a Continuation-in-Part application of patent application Ser. No. 907,093, filed May 18, 1978, now U.S. Pat. No. 4,140,308 and also a Continuation-in-Part patent application of patent application Ser. No. 6,095 filed Jan. 24, 1979 entitled WORK HOLDER and executed Jan. 17, 1979.

BACKGROUND OF THE INVENTION

This invention is concerned with work tables including work hold-down devices for use with work tables, and may include a work hold-down of the type shown in our prior U.S. Pat. No. 4,025,064 which is the only relavent prior art known to applicants.

SUMMARY OF THE INVENTION

It is among the important objects of the present invention to provide a work table including work hold-down means which permits of quick and easy adjustability for use with work pieces of many varied shapes and sizes. The instant invention comtemplates the use of one or more work hold-downs in association with a work table or table top, which are quickly and easily selectively positionable relative to the table top, and which are further effectively automatically, but releasably secured in any selected position to achieve an extreme degree of versatility in use while affording a high degree of rapidity and reliability under practical operating conditions.

It is still a further object of the present invention to provide a work table and work hold-down, the latter including a yoke or clip for slidably receiving a marginal edge of the work table top to be selectively positionable relative thereto, and which in operation is canted or cocked for jamming and positive effective securement in the selected table top position.

While the work table of the present invention has been primarily developed and employed for use in welding, and will be illustrated and described hereinafter with particular reference thereto, it is appreciated that the instant work table is capable of many varied applications all of which are intended to be comprehended herein.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
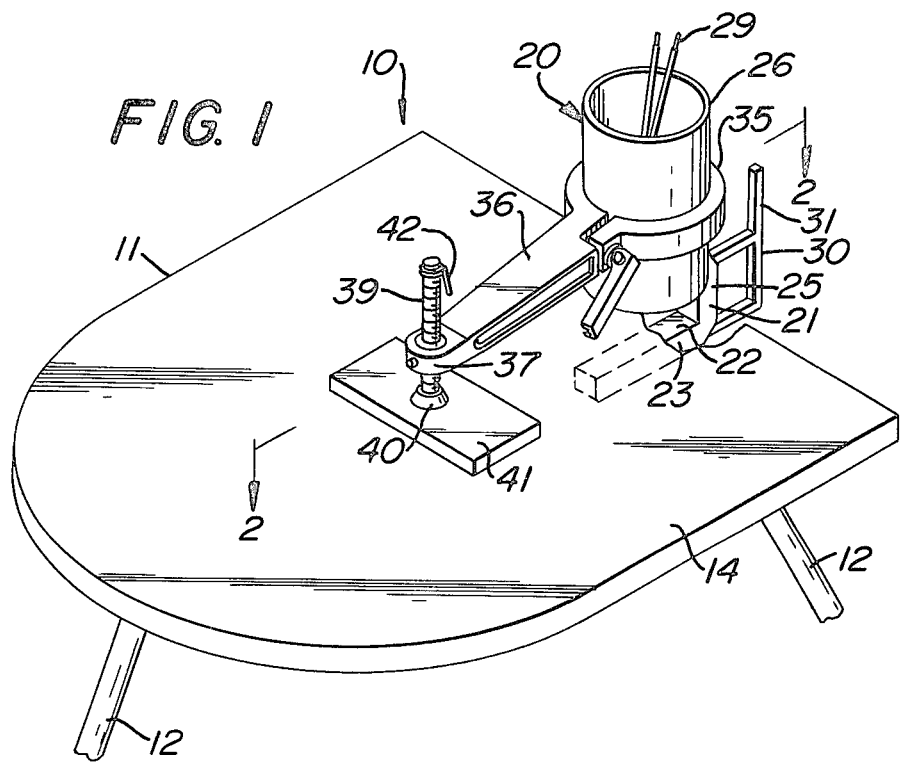
FIG. 1 is a top perspective view, partly broken away, showing a work table of the present invention in operative association with a work piece.
Figure 2:
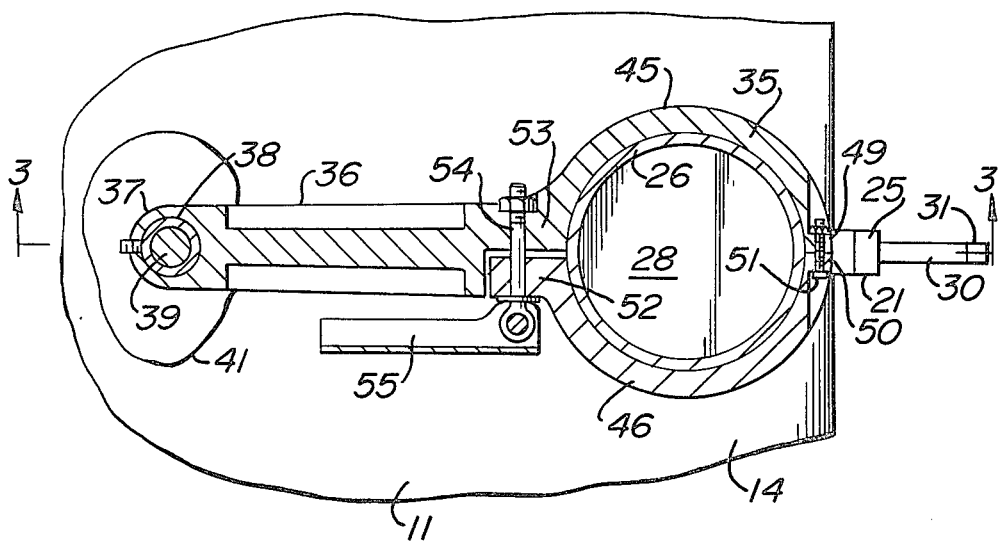
FIG. 2 is a partial horizontal sectional view taken generally along the line 2—2 of FIG. 1.
Figure 3:
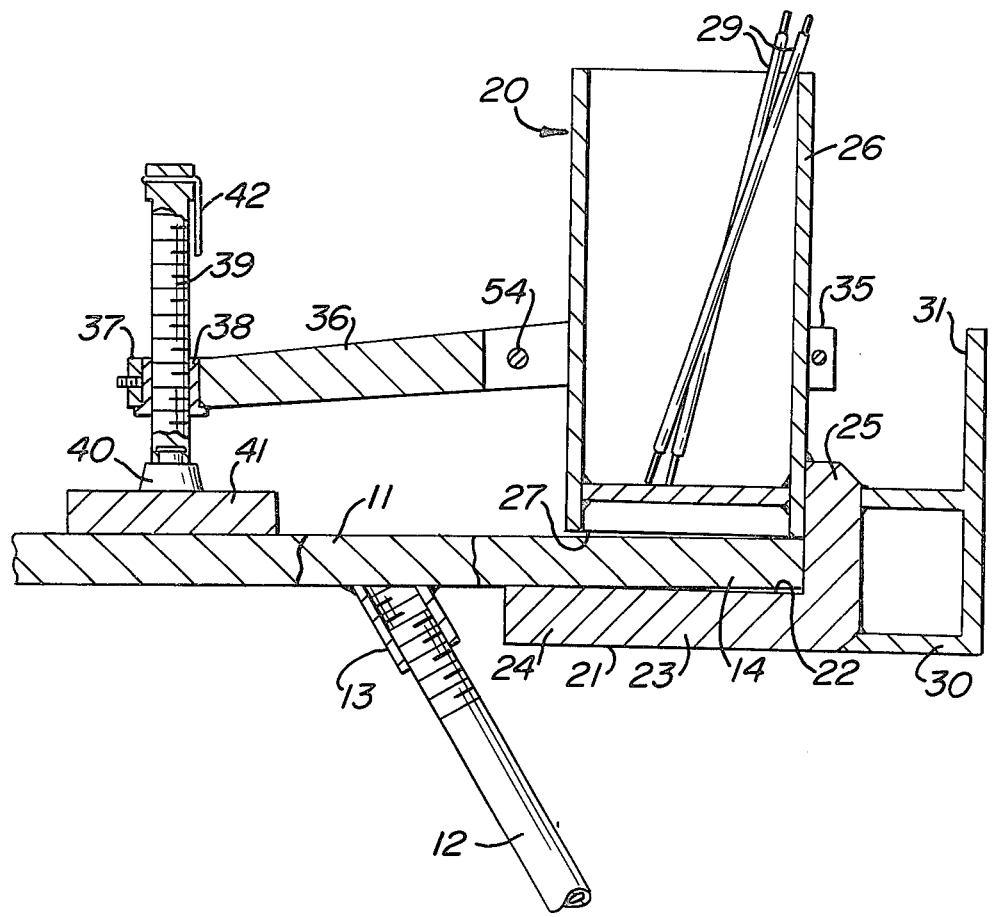
FIG. 3 is a partial sectional elevational view taken generally along the line 3—3 of FIG. 2.

Referring now more particularly to the drawings, and specifically to FIG. 1 thereof, a work holding table of the present invention is there generally designated 10, and may include a generally flat and usually horizontal table top or plate 11, which may be supported in elevated position upon a plurality of depending legs 12. The legs 12 have their upper ends secured to the underside of the table top 11, such as by an internally threaded tube or nipple 13 welded to the underside of the table top spaced inwardly from the peripheral edge of the table top. This may be seen in FIG. 3, and as there shown illustrates the edge margin or peripheral region 14 of the table top 11 is unobstructed, and particularly is not obstructed by the legs 12.

For use as a welding table, the plate 11, tubular bracket 13 and legs 12 may be of conductive material or metal, to facilitate grounding of the work clamped to the table.

Associated with the work table 10 may be one or more work hold-downs, only one being shown in the drawing for simplicity and there generally designated 20. The work hold-down may include a yoke, clasp or receiver 21 having a laterally opening internal throat or recess 22 for receiving a portion of plate edge margin 14. The throat 22 is defined by an internal dimension of the yoke 21 affording a sliding or shifting fit with respect to the received plate margin 14. Thus, the yoke 21 is selectively shiftable to a desired position in receiving relation with the margin 14.

The yoke is more specifically comprised of a generally right angular member 23, including a lower part or leg 24 engagable beneath the plate margin 14 and upstanding from the lower part a generally upright leg 25 outward beyond the marginal edge of the plate.

Spaced over the lower leg 24 is an upright member or column 26, which may have a generally cylindrical external configuration with its lower end 27 generally parallel to and spaced over the lower leg 24 to define therebetween the receiver throat 22.

The upright, column or post 26 may be hollow, as illustrated, and provided therein with a transverse, internal or bottom wall 28 suitably fixed within and closing the lower end of the column. In this manner, the column 26 may be conveniently employed as a container for supplies, such as welding rods 29.

Outstanding from the receiver or yoke 23, and specifically from the upright leg 25 outwardly away from the table top 14, may be a hand grip or handle structure 30. The handle structure may be conveniently manually grasped to facilitate sliding movement of the yoke to a selected position along the table top margin 14. Upstanding from the hand grip or handle 30, spaced outwardly from the column or post 26, may be an upright, arm or lug 31 to facilitate the support of equipment, say the hanging of a welding rod holder when not in use.

Associated with the column 26, being circumposed thereabout is a sleeve or loop 35, and extending generally radially therefrom an arm or projection 36. The end portion 37 of arm 36, remote from column 26 may be provided with a generally vertically opening, internally threaded sleeve or bushing 38, and an externally threaded presser member or shank 39 may extend through the sleeve in threaded engagement therewith. The lower end of presser 39 may be provided with a foot 40 for bearing engagement with a work piece 41 resting on the table top 11, and the upper end of presser or shank 39 may be provided with a convenient manually actuable member or handle 42 for effecting shank rotation.

The sleeve 35 may be essentially identical to that disclosed in our prior U.S. Pat. No. 4,025,064, being split and including a generally semi-cylindrical sleeve part 45 extending rigidly from the adjacent end of arm 36, and an additional generally semi-cylindrical sleeve part 46 complementary to the sleeve part 45 and combining therewith to define a generally cylindrical internal surface. The sleeve parts 45 and 46 may have their outer ends 49 and 50 suitably connected together, as by fastener means 51.

The inner end 52 of sleeve part 46 is adjacent to but separate from the inner end 53 of sleeve part 45, which is integral with arm 36. However, a tie member or bolt 54 may extend between and connect together the inner sleeve parts 52 and 53, and may be provided with a manually actuable, cammed operating member 55. By swinging of the operating member or lever 55, the sleeve 35 may be contracted to urge the arm 36 from an upwardly swung position to an outstanding position with the presser 39 in firm bearing engagement with and clamping the work 41 to the table top 11, all as set forth in greater detail in U.S. Pat. No. 4,025,064.

Simultaneously the receiver or yoke 21 is canted or cocked about its received plate edge portion 14 for jamming thereagainst and fixed positioning relative thereto.

Upon release or opening of the sleeve 35, the entire hold-down assembly 20 may be shifted to any desired position along the peripheral table top margin 14, and with the presser 39 depending into engagement with the work 41 it is only necessary to swing the lever 55 to contract the sleeve 35 and thereby simultaneously clamp the work 41 in position and effectively fix the yoke 21 in position relative to the table top. This automatic clamping of the yoke 21 in position with respect to the table is an effective time saver and safety feature.

While the hereinbefore described structure of contractile sleeve 35 may be advantageous, it is appreciated that other forms of work presser arms may be employed, if desired.

From the foregoing, it will now be understood that the work table or hold-down of the present invention is unique in affording an extreme degree of versatility in adjustment and positioning of the hold-down relative to the table, effects a substantially instantaneous clamping and releasing of the work, as desired, and is extremely reliable in its holding action, insuring electrical grounding of the work, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A work holding table comprising an elevated plate defining a table top, a yoke having a throat sized large enough to shiftably receive the edge margin of said plate for movement of said yoke to a selected position along the plate margin, a column upstanding from said yoke above and over said plate, said throat being further sized small enough to firmly cock the yoke on the plate margin upon upward force applied to said column, a sleeve having an internal dimension greater than the external dimension of and loosely circumposed about said column for sliding therealong and tiltable about a generally horizontal axis between a longitudinal position lowered relative to and slidable on the column and a canted position raised relative to and jammed against upward movement along the column, said sleeve being releasably contractible about said column to urge the sleeve from its canted position toward its longitudinal position, an arm extending from said sleeve for location over said plate and movable with said sleeve between an outstanding position and an upwardly swung position upon sleeve movement between respective longitudinal and canted positions, whereby said arm is downwardly engagable with a work piece on said table in upwardly swung position to releasably clamp the work piece on the table upon contraction of said sleeve and apply upward force to the column to firmly cock the yoke in a selected position on the plate margin.

2. A work holding table comprising an elevated plate defining a table top, a yoke having a throat sized to shiftably receive the edge margin of said plate for movement of said yoke to a selected position along the plate margin, a column upstanding from said yoke above said plate, a sleeve having an internal dimension greater than the external dimension of and loosely circumposed about said column for sliding therealong the tiltable about a generally horizontal axis between a longitudinal position relative to and slidable on the column and a canted position jammed against upward movement along the column, said sleeve being releasably con contractible about said column to urge the sleeve from its canted position toward its longitudinal position, an arm extending from said sleeve for location over said plate and movable with said sleeve between an outstanding position and an upwardly swung position upon sleeve movement between respective longitudinal and canted positions, whereby said arm is downwardly engagable with a work piece on said table in upwardly swung position to releasably clamp the work piece on the table upon contraction of said sleeve and to firmly cock the yoke in a selected position on the plate margin, said column having an upwardly opening cavity to provide a container for supplies.

3. A work holding table comprising an elevated plate defining a table top, a yoke having a throat sized to shiftably receive the edge margin of said plate for movement of said yoke to a selected position along the plate margin, a column upstanding from said yoke above said plate, a sleeve having an internal dimension greater than the external dimension of and loosely circumposed about said column for sliding therealong and tiltable about a generally horizontal axis between a generally horizontal axis between a longitudinal position relative to and slidable on the column and a canted position jammed against upward movement along the column, said sleeve being releasably contractible about said column to urge the sleeve from its canted position toward its longitudinal position, an arm extending from said sleeve for location over said plate and movable with said sleeve between an outstanding position and an upwardly swung position upon sleeve movement between respective longitudinal and canted positions, whereby said arm is downwardly engagable with a work piece on said table in upwardly swung position to releasably clamp the work piece on the table upon contraction of said sleeve and to firmly cock the yoke in a selected position on the plate margin, and a handle extending from said yoke away from said plate to conveniently manipulate said yoke along the plate margin.

4. A work holding table according to claim 3, in combination with an upwardly facing hook on said handle providing a support.

5. A work holding table according to claim 1, said yoke comprising a generally angulate shaped member having one leg engagable beneath said plate and another leg upstanding outwardly of the plate, said column being fixed to said upstanding leg spaced from said one leg for location of said column over said table, whereby the space between said one leg and column defines said throat.

6. A work holding table comprising an elevated plate defining a table top, a yoke having a throat sized large enough to shiftably receive the edge margin of said plate for movement of said yoke to a selected position along the plate margin, a column upstanding from said yoke above and over said plate, said throat being further sized small enough to firmly cock the yoke on the plate margin upon upward force applied to said column, and a presser arm outstanding from said column over said table top for downward pressing engagement with a work piece on the table top to clamp the latter in position and apply upward force to the column to cock the yoke in its selected position with respect to the plate.

7. A work holding table comprising an elevated plate defining a table top, a yoke having a throat sized to shiftably receive the edge margin of said plate for movement of said yoke to a selected position along the plate margin, a column upstanding from said yoke above said plate, a presser arm outstanding from said column over said table top for downward pressing engagement with a work piece on the table top to clamp the latter in position and cock the yoke in its selected position with respect to the plate, a handle extending from said yoke away from said plate to facilitate yoke manipulation, and an upstanding lug on said handle providing a support.

* * * * *